(12) United States Patent
Cheng et al.

(10) Patent No.: US 9,344,472 B2
(45) Date of Patent: May 17, 2016

(54) SEAMLESSLY PLAYING A COMPOSITE MEDIA PRESENTATION

(71) Applicant: Microsoft Technology Licensing, LLC, Redmond, WA (US)

(72) Inventors: Raymond W. C. Cheng, Sammamish, WA (US); Harry S. Pyle, Bellevue, WA (US); Hui Jin, Bothell, WA (US); Vishal Sood, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 335 days.

(21) Appl. No.: 13/729,366

(22) Filed: Dec. 28, 2012

(65) Prior Publication Data

US 2014/0189139 A1  Jul. 3, 2014

(51) Int. Cl.
| | |
|---|---|
| *G06F 15/16* | (2006.01) |
| *H04L 29/06* | (2006.01) |
| *H04L 29/08* | (2006.01) |
| *H04N 21/432* | (2011.01) |
| *H04N 21/443* | (2011.01) |
| *H04N 21/458* | (2011.01) |
| *H04N 21/462* | (2011.01) |
| *H04N 21/482* | (2011.01) |

(Continued)

(52) U.S. Cl.
CPC .............. *H04L 65/60* (2013.01); *H04L 29/06* (2013.01); *H04L 29/08072* (2013.01); *H04L 65/4084* (2013.01); *H04L 65/4092* (2013.01); *H04N 21/4325* (2013.01); *H04N 21/4431* (2013.01); *H04N 21/458* (2013.01); *H04N 21/4622* (2013.01); *H04N 21/4825* (2013.01); *H04N 21/812* (2013.01); *H04N 21/84* (2013.01); *H04N 21/8455* (2013.01); *H04N 21/8456* (2013.01)

(58) Field of Classification Search
CPC .................... H04L 29/06; H04L 29/08072
USPC ................................... 709/230–231
See application file for complete search history.

(56) References Cited

U.S. PATENT DOCUMENTS

| | | |
|---|---|---|
| 6,115,035 A | 9/2000 | Compton et al. |
| 7,076,478 B2 | 7/2006 | O'Rourke et al. |

(Continued)

OTHER PUBLICATIONS

Markanda, et al., "Dynamic Ad-insertion in Hybrid Content Delivery Networks", Retrieved at<<http://www.techmahindra.com/Documents/WhitePaper/DynamicAdInsertioninHybridCDN_Sept10.pdf>>, Proceedings of the in white papers of Tech Mahindra, Sep. 2010, pp. 10.

(Continued)

*Primary Examiner* — Chris Parry
*Assistant Examiner* — Weiwei Stiltner
(74) *Attorney, Agent, or Firm* — Ben Tabor; Fehmi Chebil; Micky Minhas

(57) ABSTRACT

A computer-implemented method for seamlessly playing a composite media presentation, includes receiving, by a sequencer, a sequential playlist provided by a scheduler. The sequential playlist refers to a sequence of one or more streaming media content items. The sequencer receives calls from a native player application at regular intervals, and sends playback segments and seekbar update information to the native player application based on the sequential playlist in response to the calls. The native player application is configured to play the composite media presentation using at least one core player and generate a corresponding seekbar for the presentation based on the playback segments and the seekbar update information sent by the sequencer.

19 Claims, 3 Drawing Sheets

(51) Int. Cl.
*H04N 21/81* (2011.01)
*H04N 21/84* (2011.01)
*H04N 21/845* (2011.01)

(56) References Cited

U.S. PATENT DOCUMENTS

| | | | |
|---|---|---|---|
| 7,912,217 B2 | 3/2011 | Baugher et al. | |
| 8,051,445 B2 | 11/2011 | Barrett et al. | |
| 8,078,696 B2 | 12/2011 | LaJoie et al. | |
| 8,108,257 B2 | 1/2012 | Sengamedu | |
| 2005/0278759 A1 | 12/2005 | Unger | |
| 2007/0022183 A1* | 1/2007 | Klemets | 709/219 |
| 2008/0218590 A1* | 9/2008 | Park et al. | 348/143 |
| 2008/0255943 A1* | 10/2008 | Morten et al. | 705/14 |
| 2008/0307454 A1 | 12/2008 | Ahanger et al. | |
| 2009/0070288 A1* | 3/2009 | Herbeck et al. | 707/2 |
| 2009/0080853 A1* | 3/2009 | Chen et al. | 386/52 |
| 2009/0089401 A1 | 4/2009 | Zhang et al. | |
| 2009/0113389 A1* | 4/2009 | Ergo et al. | 717/120 |
| 2009/0193465 A1* | 7/2009 | Yi | 725/41 |
| 2009/0297123 A1 | 12/2009 | Virdi et al. | |
| 2010/0043022 A1* | 2/2010 | Kaftan | 725/34 |
| 2010/0114921 A1 | 5/2010 | Bocharov et al. | |
| 2010/0146542 A1 | 6/2010 | Weihs et al. | |
| 2010/0180011 A1 | 7/2010 | Sood et al. | |
| 2010/0235472 A1 | 9/2010 | Sood et al. | |
| 2010/0235528 A1 | 9/2010 | Bocharov et al. | |
| 2010/0319017 A1 | 12/2010 | Cook | |
| 2011/0055209 A1* | 3/2011 | Novac et al. | 707/737 |
| 2011/0080940 A1 | 4/2011 | Bocharov et al. | |
| 2011/0083037 A1 | 4/2011 | Bocharov et al. | |
| 2011/0090645 A1* | 4/2011 | Jobs et al. | 361/679.56 |
| 2011/0096828 A1 | 4/2011 | Chen et al. | |
| 2011/0161485 A1 | 6/2011 | George et al. | |
| 2011/0231660 A1 | 9/2011 | Kanungo | |
| 2011/0296109 A1 | 12/2011 | Sood et al. | |
| 2011/0307781 A1 | 12/2011 | Sood et al. | |
| 2012/0002717 A1 | 1/2012 | Ma et al. | |
| 2012/0023251 A1 | 1/2012 | Pyle et al. | |
| 2012/0174152 A1 | 7/2012 | Ye et al. | |
| 2012/0177101 A1* | 7/2012 | van der Schaar | 375/240.01 |
| 2012/0239621 A1* | 9/2012 | Savenok et al. | 707/634 |
| 2012/0323917 A1* | 12/2012 | Mercer et al. | 707/737 |
| 2013/0212222 A1* | 8/2013 | Outlaw | 709/219 |
| 2014/0040026 A1* | 2/2014 | Swaminathan et al. | 705/14.53 |
| 2014/0075582 A1* | 3/2014 | Hierro et al. | 726/30 |
| 2014/0129618 A1* | 5/2014 | Panje et al. | 709/203 |
| 2014/0149539 A1* | 5/2014 | MacInnis | 709/217 |
| 2014/0289623 A1* | 9/2014 | Riggs et al. | 715/716 |

OTHER PUBLICATIONS

"Emerging IPTV Advertising Opportunities", Retrieved at<<http://next-generation-communications.tmcnet.com/topics/innovative-services-advanced-business-models/articles/42283-emerging-iptv-advertising-opportunities.htm>>, Oct. 8, 2008, pp. 10.

Non-Final Office Action for U.S. Appl. No. 13/729,467, dated May 10, 2013, 26 pgs.

Final Office Action for U.S. Appl. No. 13/729,467, dated Nov. 15, 2013, 31 pgs.

Notice of Allowance for U.S. Appl. No. 13/729,467, dated Aug. 4, 2014, 10 pgs.

"HTTP Dynamic Streaming on the Adobe® Flash® Platform", Retrieved at<<https://bugbase.adobe.com/index.cfm?event=file.view&id=2943064&seqNum=6&name=httpdynamicstreaming_wp_ue.pdf>>, Proceedings of the Adobe Flash Platform Technical White Paper, Retrieved Date Oct. 17, 2012, pp. 18.

Goodman, Grant., "Delivering Live Streaming Video with DVR", Retrieved at<<http://support.brightcove.com/en/docs/delivering-live-streaming-video-dvr>>, Retrieved Date Oct. 17, 2012, pp. 8.

"Leightronix", Retrieved at<<http://www.leightronix.com/products_labvault_sd.php#>>, Aug. 24, 2010, pp. 2.

"Digital Media and Video Surveillance Design", Retrieved at<<http://www.cisco.com/en/US/docs/solutions/Enterprise/Education/SchoolsSRA_DG/SchoolsSRA_chap8.pdf>>, Retrieved Date Oct. 17, 2012, pp. 34.

"Delivering Live and On-Demand Smooth Streaming", Retrieved at<<http://download.microsoft.com/download/4/E/5/4E599FBB-6E34-4A74-B3C5-1391CB0FD55F/Delivering_Live_and_On-Demand_Smooth_Streaming.pdf>>, Jul. 2, 2010, pp. 28.

* cited by examiner

SEAMLESSLY PLAYING A COMPOSITE MEDIA PRESENTATION

BACKGROUND

Streaming media is multimedia that is constantly received by, and normally presented to, an end-user (using a client) while it is being delivered by a streaming provider (using a server). Streaming can be accomplished using stateless communication between the client and server by breaking media up into chunks that are individually addressable and can be individually requested by clients. For a particular media event or content item, the streaming server provides a manifest file that describes each of the chunks that comprise the event. For example, a one-minute video may include 60 one-second audiovisual chunks. Each chunk contains metadata and media content.

The metadata may describe useful information about the media content, such as the hit rate of the media content, where the media content fits into a larger media element, a codec used to encode the media content, and so forth. The client uses this information to place the chunk into a storyboard of the larger media element and to properly decode and playback the media content. The chunks can be in any format, such as Motion Picture Experts Group (MPEG) 4 boxes or other containers. A client plays a media event to a user by reading the manifest and regularly requesting chunks from the server. The user may also skip around (e.g., seek, fast forward, rewind) and the client can provide these behaviors by requesting later or earlier chunks described by the manifest. For live events, the server may provide the manifest to the client piecemeal, so that the server informs the client of newly available chunks as they become available.

While these streaming techniques provide a great experience for viewing streaming media over the Internet and other networks, users often want to view (and producers of content often want to provide) content that comes from different sources or from different existing content items, including advertisements and highlight videos. For example, a sports network may want to provide a highlight video at the end of each day that includes some new commentary and some selections from earlier media events. Today the sports network can provide links to each video, but users may not want to view dozens of different video streams or files. Producers of content do not want to re-encode or repackage each earlier content item for rerelease as a new content item for these types of purposes. By repackaging the content the publisher can provide the user with familiar smooth streaming controls, such as skipping forward and backward in a stream. In many cases, the producer may want to provide quick turnaround to create highlights using a combination of on-demand and live assets immediately after an event or even as an event is still on-going (e.g., for late joining viewers of the event).

SUMMARY

Some embodiments are directed to a single, unified solution for a number of content splicing scenarios, including: (1) Spliced highlight reels where content from a variety of sources is spliced together into a single linear presentation; (2) traditional Web advertisements (i.e., non-linear, or pause timeline true) in which playback of the main content is paused, exclusive playback of the advertisement is performed, and then the system returns to the main content at the paused position; and (3) linear advertisements that overwrite and replace main content as if the linear advertisements were part of the main content all along.

One embodiment is directed to a computer-implemented method for seamlessly playing a composite media presentation. The method includes receiving, by a sequencer, a sequential playlist provided by a scheduler. The sequential playlist refers to a sequence of one or more streaming media content items. The sequencer receives calls from a native player application at regular intervals, and sends playback segments and seekbar update information to the native player application based on the sequential playlist in response to the calls. The native player application is configured to play the composite media presentation using at least one core player and generate a corresponding seekbar for the presentation based on the playback segments and the seekbar update information sent by the sequencer.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

Specific embodiments are directed to: (1) A method to specify linear and non-linear playback sequences in a sequential playlist, which supports on-demand and live playback, including real-time updates to playback range and dynamic scheduling of advertisements, and trick mode (i.e., fast forward and rewind); (2) a pull mode sequencer that is reactive, whereas other sequencers are typically push-mode, meaning that they are expected to carry out all aspects of sequencing (using a pull mode makes embodiments easier to integrate into existing players); (3) a sequencer plug-in chaining application programming interface (API) that allows for user and third-party full customization of the sequencer to meet a wide range of advertising models, advertising verification, and player functionality (such as format-agnostic captioning); (4) a unified method to display a proper seekbar for spliced highlight reels, traditional non-linear web advertisements, and linear advertisements; (5) a method to implement seek-to-live and resume-from-last-played in the presence of spliced highlight reels, traditional non-linear web advertisements, and linear advertisements; (6) a method to abstract player seek accuracy to deal with the fact that some players support accurate seek, while others adjust the seek position to the nearest i-frame; (7) deferred resolution of advertisements, which allows for just-in-time individualized advertisements; (8) a method to offload computation to a server-side (Cloud) component, which brings a number of advantages, including better programming environment to handle complexity, better network connections and ability to update on a constant basis; and (9) a method to integrate static advertisements into media playlists. Embodiments support a varying degree of seamlessness and work with Microsoft players and non-Microsoft players, including players in which no low-level control is provided.

Figure 1:
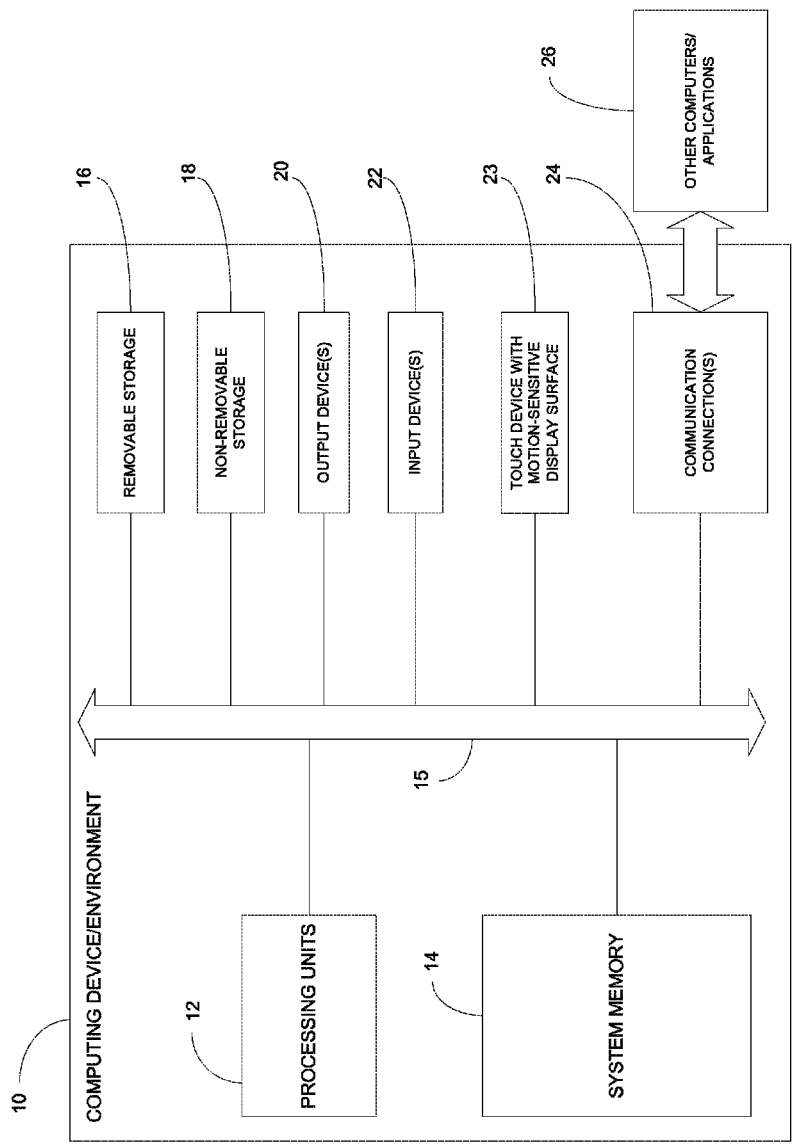
FIG. 1 is a block diagram illustrating a computing environment suitable for implementing aspects of a media player system according to one embodiment.

FIG. 1 is a diagram illustrating a computing environment 10 suitable for implementing aspects of a media player system according to one embodiment. In the illustrated embodiment, the computing system or computing device 10 includes one or more processing units 12 and system memory 14. Depending on the exact configuration and type of computing device, memory 14 may be volatile (such as RAM), non-volatile (such as ROM, flash memory, etc.), or some combination of the two.

Computing device 10 may also have additional or different features/functionality and additional or different hardware and software. For example, computing device 10 may also include additional storage (removable and/or non-removable) including, but not limited to, magnetic or optical disks or tape. Such additional storage is illustrated in FIG. 1 by removable storage 16 and non-removable storage 18. Computer storage media includes volatile and nonvolatile, removable and non-removable media implemented in any suitable method or technology for non-transitory storage of information such as computer readable instructions, data structures, program modules or other data. Memory 14, removable storage 16 and non-removable storage 18 are all examples of computer storage media (e.g., computer-readable storage media storing computer-executable instructions that when executed by at least one processor cause the at least one processor to perform a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, and does not include transitory storage media. Any such computer storage media may be part of computing device 10.

The various elements of computing device 10 are communicatively coupled together via one or more communication links 15. Computing device 10 also includes one or more communication connections 24, such as network connections, that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc. In one embodiment, computing device 10 also includes a touch device with a motion-sensitive display surface 23.

FIG. 1 and the above discussion are intended to provide a brief general description of a suitable computing environment in which one or more embodiments may be implemented. It should be understood, however, that handheld, portable, and other computing devices of all kinds are contemplated for use. FIG. 1 thus illustrates an example of a suitable computing system environment 10 in which the embodiments may be implemented, although as made clear above, the computing system environment 10 is only one example of a suitable computing environment and is not intended to suggest any limitation as to the scope of use or functionality of the embodiments. Neither should the computing environment 10 be interpreted as having any dependency or requirement relating to any one or combination of components illustrated in the exemplary operating environment 10.

Figure 2:
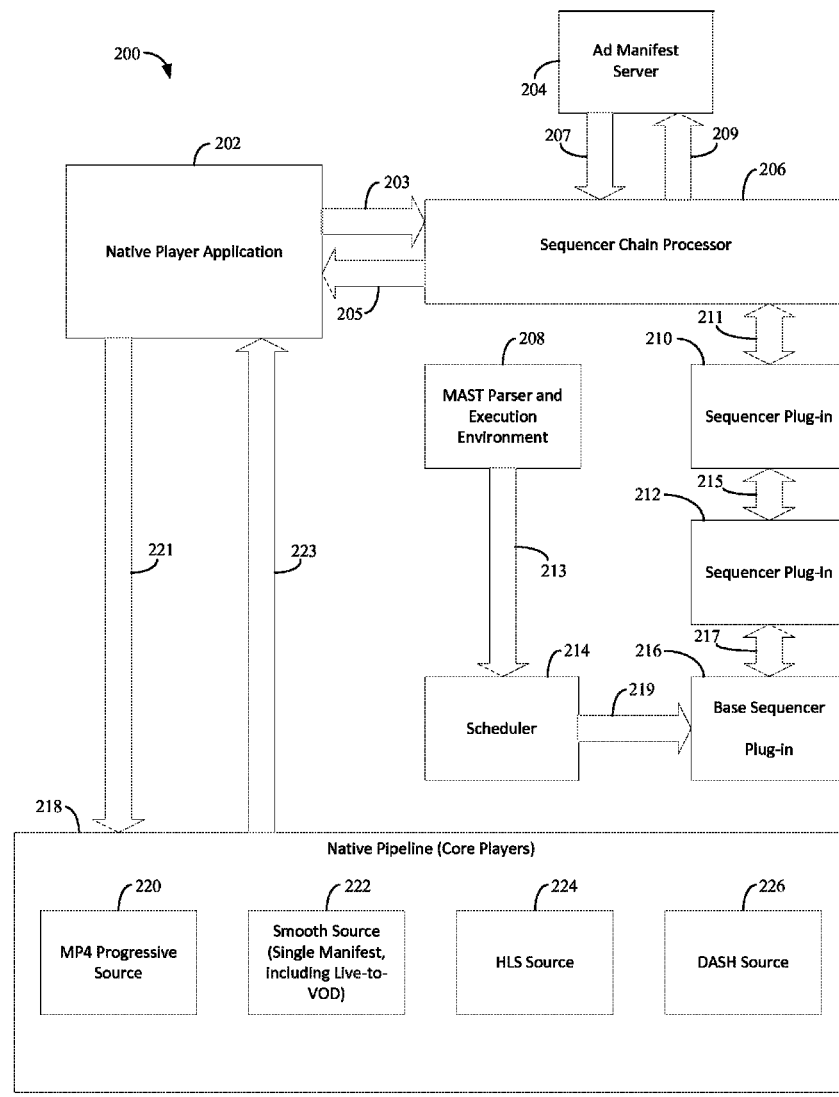
FIG. 2 is a block diagram illustrating a client media player system according to one embodiment.

FIG. 2 is a block diagram illustrating a client media player system 200 according to one embodiment. In one embodiment, media player system 200 is implemented with a computing system, such as computing system 10 (FIG. 1). Media player system 200 according to one embodiment performs segmented playback using core players. In some embodiments, system 200 provides digital video recorder (DVR)-like functionality for media streams, including live media streams. System 200 provides users with the ability to pause a live stream, seek within the live stream, and so forth. In a live stream, there are several scenarios like a missed scene, a pause to take a break, joining the event late and intending to watch from start, and so forth, that are enabled by the system 200 to allow the user to play media fragments in various orders and at various times. The system 200 includes client controls to respond to user actions and manage playback of a live stream in a non-live mode. In addition, the client can switch between live and non-live viewing during playback.

The media player system 200 includes native player application 202, advertisement (ad) manifest server 204, sequencer chain processor 206, media abstract sequencing template (MAST) parser and execution environment 208, sequencer plug-ins 210, 212, and 216, scheduler 214, and native pipeline (core players) 218. Native pipeline 218 includes Motion Picture Experts Group 4 (MPEG4 or MP4) progressive source 220, Smooth source (single manifest, including live-to-VOD), HTTP live streaming (HLS) source 224, and dynamic adaptive streaming over HTTP (DASH) source 226. A native player application according to one embodiment, such as native player application 202, is an application that communicates directly with a native pipeline (e.g., native pipeline 218) to play media content. In the illustrated embodiment, sources 220, 222, 224, and 226 are core players. In one embodiment, a core player is a player or pipeline configuration that is capable of playing single-segment content, such as progressive, HLS, DASH, Flash or Smooth (non-RCE).

Native player application 202 provides creation and control information to core players 218, which is represented by arrow 221. Core players 218 provide position update information and live left/right information to native player application 202, which is represented by arrow 223. Native player application 202 provides seek, playthrough, position update, and buffering complete information to sequencer chain processor 206, which is represented by arrow 203. Sequencer chain processor 206 provides new playback (PB) segments and seekbar left/right information to native player application 202, which is represented by arrow 205. Ad manifest server 204 provides individualized ad manifests and live updates to sequencer chain processor 206, which is represented by arrow 207. Sequencer chain processor 206 provides web requests and individual information and polling information to ad manifest server 204, which is represented by arrow 209. MAST parser and execution environment 208 provides SetMainContent, ScheduleClip, and SetDVRWindowModel command information to scheduler 214, which is represented by arrow 213. Scheduler 214 provides a sequential playlist, playlist updates, initialization parameters for a live DVR model and updates to base sequencer 216, which is represented by arrow 219. Sequencer plug-ins 210, 212, and 216 communicate with each other and with sequencer chain processor 206 via an IPlayerSequencer interface, which is represented by arrows 211, 215, and 217.

Sequencer chain processor 206 and sequencer plug-ins 210, 212, and 216 make up sequencer 228. In one embodiment, sequencer 228 includes the following four features:

(1) Allows for playback of segmented content in a linear manner (as if the segmented content had actually been re-encoded into a single presentation). This includes support for both web scenarios and broadcast:

a. Non-linear (pause timeline true) advertisements, overtop of live or on-demand content;

b. Linear overlay advertisements (also known as pause timeline false advertisements), overtop of live or on-demand content;

c. Linear blackout overtop of live content; and d. Rough-cut editing.

(2) Allows full variation from segment to segment. This means that codecs and protocols (Smooth/DASH/HLS/Progressive) are able to change from one segment to the next.

(3) Is portable to multiple platforms such as Windows 8 and iOS (iPad/iPhone).

(4) Is easily integrated into existing native player applications.

In one embodiment, the sequencer 228 executes a sequential playlist. The scheduler 214 uses protocols to initially construct the sequential playlist, and continually update the sequential playlist in the case of live content.

A large number of functions are performed for the management of advertisements, so in order to break the functionality down into isolated pieces, the interface for sequencer 228 is exposed to the public for use by the native player application 202, and the sequencer 228 is implemented using a chain of sequencer plug-ins 210, 212, and 216. In one embodiment, each of the sequencer plug-ins 210, 212, and 216 calls the next plug-in in the chain directly, rather than having a central processor call the next plug-in. Higher plug-ins have the ability to override the decisions of lower plug-ins.

In one embodiment, sequencer plug-in 210 provides a live DVR model that models the server live position and DVR window so that the seekbar can be properly painted. Note that the DVR model may also be the "start-over" model that paints a seekbar that corresponds to Electronic Program Guide (EPG) entries. Sequencer plug-in 210 can be implemented in a format-agnostic or format-specific way. In one embodiment, sequencer plug-in 210 also includes a future ads update model, and a playback range dynamic playback policy model. Sequencer plug-in 210 according to one embodiment superimposes playback policy on top of the sequential playlist playback policy, to prevent fast forward at live position, rewind or pause at left edge of DVR, etc.

In one embodiment, sequencer plug-in 212 includes an ad analytics and tracking model that acts as an event source for reporting of advertisement playback start, quartiles, and completion, and an event sink for user-initiated events such as muting, pause, and click-through.

In one embodiment, sequencer plug-in 216 is a base sequencer that takes a strictly sequential playlist from scheduler 214 and, through an API exposed by sequencer chain processor 206, allows native player application 202 to find out what it should be playing or buffering next. The public interface exposed to the native player application 202 is named "IPlayerSequencer." In one embodiment, the base sequencer 216 is stateless. The API of the base sequencer 216 involves the caller (i.e., native player application 202) providing a pointer to the sequential playlist entry that is currently playing, which provides all the state information for the base sequencer 216. The base sequencer 216, therefore, does not track which playlist entry is currently playing. This simplifies the design of the base sequencer 216. The base sequencer 216 according to one embodiment does account for the fact that the currently playing entry has been invalidated.

The base sequencer 216 according to one embodiment provides low-level access to modification of the sequential playlist. This allows the application 202 to make small changes via the sequencer 216, such as skipping entries or modifying existing entries. Higher level scheduling APIs are provided by the scheduler 214.

In one embodiment, the chaining model for the plug-ins 210, 212, and 216 is that the current plug-in is itself responsible for calling the next plug-in in the chain. Thus, there are two kinds of sequencer plug-ins: (1) A forwarding plug-in, which calls the next plug-in in the chain, and is free to apply its own adjustments to inputs and outputs of downstream plug-ins; and (2) a non-forwarding plug-in. In one embodiment, only the base sequencer 216 is a non-forwarding plug-in. As a result, the base sequencer resides at the end of the plug-in chain. All other plug-ins (e.g., plug-ins 210 and 212) are of the forwarding type.

A forwarding plug-in according to one embodiment implements an IPlayerSequencerPluginChain interface, which allows the instantiator (e.g., native player application 202) to insert the plug-in into the chain by calling GetNextPlugin and SetNextPlugin. The following Pseudo Code Example I shows an example of how a forwarding plug-in might add its own logic to skip an advertisement if an advertisement has already been played recently (e.g. within 2 minutes):

---

PSEUDO CODE EXAMPLE I

```
void OnEndOfMedia(AutoRefPtr<PlaybackSegment> currentSegment,
        ManifestTime currentPlaybackPosition,
        double currentPlaybackRate,
        out AutoRefPtr<PlaybackSegment> **ppNextSegment)
{
    // Forward the request to the next plugin in the chain to find out what
    to play next
    _nextPlugin->OnEndOfMedia(currentSegment,
currentPlaybackPosition, currentPlaybackRate,
        ppNextSegment);
    // If next segment is an advertisement, but we have already played an ad
    // in the last 2 mins, skip it
    while (null != *ppNextSegment &&
        (*ppNextSegment)->Clip( )->IsAdvertisement( ) &&
        HasCompletedAdInLast2Mins( ))
    {
        // Skip this ad, in the direction of playback (forwards or reverse)
        if (currentPlaybackRate >= 0)
        {
            _nextPlugin->SkipForward(*ppNextSegment, ppNextSegment);
        }
        else
        {
            _nextPlugin->SkipBack(*ppNextSegment, ppNextSegment);
        }
    }
}
```

---

Note that a complete ad-skipping implementation applies the same logic to all other IPlayerSequencer methods that return a new playback segment (e.g., Seek, SkipForward, SkipBack, etc.). This is a reason why the native player application 202 implements its own customizations in a sequencer plug-in, rather than above the sequencer level.

In one embodiment, sequencer 228 uses a "pull" model, which makes it easier to integrate into existing platform-specific single-segment players. With the pull model, the native player application 202 asks the sequencer 228 what the application 202 should play next. In one embodiment, seekbar updates and playback segments are pulled by application 202 from sequencer 228. Using a pull model, a platform-independent resource (e.g., sequencer 228) is provided that is used by platform-dependent players (e.g., application 202) to implement segmented playback.

The design of sequencer 228 is accepting of players that do not support accurate seek. In one embodiment, segment playback is serialized—there is no continuous rendering between segments. Pipeline timestamps are unambiguous (the native player application 202 is still responsible for identifying the currently playing segment, but it can do so unambiguously). Any pipeline timestamps prior to the splice-in point can therefore be easily hidden from the seekbar by the sequencer 228.

The following Pseudo Code Example II provides some example public APIs for sequencer 228 according to one embodiment:

Pseudo Code Example II

```
struct PlaybackSegment
{
    AutoRefPtr<SequentialPlaylistEntry> Clip( ); // URI, playback range, custom attributes
    ManifestTime    InitialPlaybackStartTime( );
    double          InitialPlaybackRate( );
}
struct PlaybackPolicy
{
    bool AllowSeek( );
    bool AllowRewind( );           // Playback rates < 0
    bool AllowFastForward( );      // Playback rates > 1
    bool AllowSkipBack( );         // Back as in previous playlist entry
    bool AllowSkipForward( );      // Forward as in next playlist entry
    bool AllowPause( );            // Disallowed if already at left edge of DVR
}
// All functions have side effects unless explicitly stated that they do not. This
// means that calling ManifestToSeekbarTime with random timestamps may change
// the behaviour of the sequencer
interface IPlayerSequencer
{
    // Conversion function to allow app to properly paint seekbar. App is required to
    // call frequently.
    void ManifestToSeekbarTime(
        AutoRefPtr<PlaybackSegment> currentSegment,
        double playbackRate,                    // Needed to check on range
        ManifestTime currentPlaybackPosition,   // As reported by pipeline
        ManifestTime minManifestPosition,       // As reported by pipeline
        ManifestTime maxManifestPosition,       // As reported by pipeline
        out SeekbarTime *pCurrentSeekbarPosition,// Linear pos or passthrough
                                                // (PT=true)
        out SeekbarTime *pMinSeekbarPosition,   // Linear pos or passthrough
                                                // (PT=true)
        out SeekbarTime *pMaxSeekbarPosition    // Linear pos or passthrough
                                                // (PT=true)
        out PlaybackPolicy *pPlaybackPolicy,    // Whether trick mode, etc. is
                                                // allowed
        out bool *pfPlaybackRangeExceeded);     // If true, application must stop
                                                // playback as if end-of-media
                                                // reached, and call
                                                // OnEndOfMedia
    // This function has no side effects and is used to determine resume from last
    // played position
    void ManifestToLinearTime(AutoRefPtr<PlaybackSegment> currentSegment,
            ManifestTime playbackPosition,
                out LinearTime **ppLinearPosition, // Linear start time if
                                                   // PT=true
                out bool *pfIsOnLinearTimeline);   // False if playing PT=true ad
    void Seek(LinearTime linearSeekPos,
        out AutoRefPtr<PlaybackSegment> **ppSeekSegment); // Resume from
                                                          // previous session
    void Seek(AutoRefPtr<PlaybackSegment> currentSegment,
        SeekbarTime seekbarSeekPos,
        out AutoRefPtr<PlaybackSegment> **ppSeekSegment); // User clicks on
                                                          // seekbar
    // Sequential Playlist Navigation
    void SkipBack(AutoRefPtr<PlaybackSegment> currentSegment,
            out AutoRefPtr<PlaybackSegment> **ppNextSegment);
    void SkipForward(AutoRefPtr<PlaybackSegment> currentSegment,
            out AutoRefPtr<PlaybackSegment> **ppNextSegment);
    // Player calls this upon end-of-media, to find out what it should do next - has side
    // effects
    void OnEndOfMedia(AutoRefPtr<PlaybackSegment> currentSegment,
            ManifestTime currentPlaybackPosition,
```

Pseudo Code Example II

```
            double currentPlaybackRate,              // Set to 0 if paused
            out AutoRefPtr<PlaybackSegment> **ppNextSegment);
    // Equivalent to OnEndOfMedia, but no side effects - used to peek at next
    // playback segment so that native player can implement double-buffering to hide
    // startup and buffering latency
    void OnEndOfBuffering(AutoRefPtr<PlaybackSegment> currentSegment,
            ManifestTime currentPlaybackPosition,
            double currentPlaybackRate,              // Set to 0 if paused
            out AutoRefPtr<PlaybackSegment> **ppNextSegment);
    // Acts similar to OnEndOfMedia but in the case of error. On error, we could
    // choose to substitute a different advertisement, or stop playback if main content.
    void OnError(AutoRefPtr<PlaybackSegment> currentSegment,
            ManifestTime currentPlaybackPosition,
            double currentPlaybackRate,              // Set to 0 if paused
            string errorDescription,
            out AutoRefPtr<PlaybackSegment> **ppNextSegment);
    // Low-level playlist access - caller can modify the list at any time, after locking it
    // of course
    AutoRefPtr<ISequentialPlaylist> SequentialPlaylist(void);
}
interface IPlayerSequencerPluginChain
{
    void SetNextPlugin(AutoRefPtr<IPlayerSequencer> *pNext);
    AutoRefPtr<IPlayerSequencer> GetNextPlugin(void);
}
enum PlaylistEntryType
{
    PLAYLISTENTRYTYPE_MEDIA,    // URI points to single-segment
                                // Smooth/HLS/DASH/progressive media
    PLAYLISTENTRYTYPE_STATIC,   // URI points to static page (eg. post-roll
                                // recommender/share page)
    PLAYLISTENTRYTYPE_VAST,     // URI points to VAST manifest - client is
                                // responsible for resolving to media URI
    PLAYLISTENTRYTYPE_SEEKTOSTART    // URI points to single-segment
                                // Smooth/HLS/DASH or null if
                                // on-demand. This is a delete-
                                // after-playing entry and the only
                                // way to complete is
                                // OnEndOfMedia or Seek.
                                // ManifestToSeekbarTime will not
                                // terminate playback due to the
                                // need to establish live DVR
                                // model.
                                // See design spec for details.
}
class SequentialPlaylistEntry : public IRefObject
{
    // Per-Entry attributes. Can hold ISmoothStreamingCache for RCE, playback
    // policy, etc.
    void AddAttributes(IRefObject *pAttributes);
    bool GetAttributes(GUID& iidAttributes, IRefObject **ppAttributes);
    CircularReference   Playlist;    // Circular reference to playlist which contains
                                     // this entry
                                     // Keeping a ref to this entry keeps entire
                                     // playlist alive
    PlaylistEntryType EntryType;
    LinearTime       LinearStartTime( );
    LinearTime       LinearDuration( ); // Set to 0 for pause timeline true
    URI              ClipURI( ); // Single-manifest URI.
                                     // can be Smooth/DASH/HLS/Progressive/Static/VAST
                                     // or null for seek-to-start if scheduler knows content
                                     // is on-demand
    ManifestTime     MinRenderingTime( );
    ManifestTime     MaxRenderingTime( );
    void SetMinRenderingTime(ManifestTime minRenderingTime);
    void SetMaxRenderingTime(ManifestTime maxRenderingTime);
    bool             IsAdvertisement( );
    bool             DeleteAfterPlaying( ); // Can be deleted during
                                     // IPlayerSequencer::OnEndOfMedia,
                                     // Seek or Skip[Back|Forward]
}
interface ISequentialPlaylist
{
    // Thread Synchronization
    void LockList( );
    bool IsLockedThisThread( ); // Used to confirm that lock is held when changes
                                // being made
```

Pseudo Code Example II

```
    void UnlockList( );
    vector<SequentialPlaylistEntry> SequentialPlaylist( );
}
```

The scheduler 214 is responsible for producing a strictly sequential playlist, which can be fed to sequencer 228 for playback on a series of core players 220, 222, 224, and 226. In the case of live content, the scheduler 214 is responsible for updating the playlist using a model of server live (e.g., rolling DVR window). In one embodiment, the scheduler 214 uses a parallel representation of manifests internally (e.g., advertisement manifests overlaid on top of a main content manifest) and exposes an API (ScheduleClip) for a dynamic ad scheduler to place advertisements. Scheduler 214 may be implemented in multiple ways (e.g., simple schedulers for VOD-only playback, up to broadcast scenario schedulers).

may provide additional initialization parameters); and (3) initialization data for a live update model (playlist sequence number, polling interval to discover new advertisements, etc.), which is used by the client to instantiate an object.

In one embodiment, the sequencer 228 and the scheduler 214 are implemented with JavaScript. The scheduler 214 can be implemented on the client side or on the server side.

In one embodiment, scheduler 214 is implemented as a VOD scheduler that supports pause timeline true advertisements on top of on-demand main content. This implementation of scheduler 214 has no need for a live DVR model or advertisement updates. The following Pseudo Code Example III provides an example API for such a scheduler:

Pseudo Code Example III

```
interface ISimpleVODScheduler : public IRefObject
{
    IAsyncResult *BeginSetMainContent(URI presentationURI); // Must be on-
                                                              // demand, e.g.,
                                                              // VOD manifest or
                                                              // RCE
    IAsyncResult *BeginSetMainContent(URI presentationURI, Stream manifest);
    IPlayerSequencer *EndSetMainContent(IAsyncResult *asyncResult);
    ScheduleClip( ); // Pause Timeline True only
    // This is the output from the scheduler
    vector<SequentialPlaylistEntry> SequentialPlaylist( );
}
```

The scheduler 214 provides the application 202 with a low-level API for sequential playlist modification. Typically, higher-level functionality is desired by the MAST parser and execution environment 208. This is supplied by the scheduler 214 via functions names ScheduleClip, ScheduleLinearClip, and ScheduleLinearBlackout. The scheduler 214 is also responsible for updating the playlist, such as modeling the live DVR window and scheduling new (future) advertisements as they are known. With regard to advertisements, the scheduler 214 deals with the "when" or "where" to schedule advertisements, and the "what" is done on the client (e.g., native player application 202).

Example components associated with the scheduler 214 include: (1) MAST parser and execution environment 208, which describes the business logic and the appropriate times to schedule an advertisement (relative to the content); (2) a scheduler API that exposes a parallel playlist model (e.g., a two-level parallel structure of advertisements scheduled on top of underlying main content), and provides an API for the MAST execution environment 208 to schedule advertisements; (3) a live update mechanism that detects and executes updates to the MAST manifest, which allows future advertisements to be continuously scheduled; and (4) a live DVR window model that allows the client to paint the proper seekbar without necessarily requiring format-specific code.

The output of the scheduler 214 includes: (1) A sequential playlist; (2) initialization data for a live DVR window model, which updates the seekable range of the sequential playlist over time (the client (e.g., native player application 202) will typically instantiate an object using this initialization data and In another embodiment, scheduler 214 is implemented as a live scheduler that supports scheduling of linear overlay advertisements on top of on-demand or live content. The live scheduler implementation builds on the VOD scheduler discussed above and adds the functions given in the following Pseudo Code Example IV:

Pseudo Code Example IV

```
interface ILiveScheduler : public ISimpleVODScheduler
{
    // Main Content can be on-demand or live
    SetDVRWindowModel( ); // Can be rolling DVR, start-over model
    (EPG)
    ScheduleLinearClip( );
    // This is the output from the scheduler
    vector<SequentialPlaylistEntry> SequentialPlaylist( );
    IPlayerSequencer LiveDVRModel( );
    IPlayerSequencer FutureAdUpdateModel( );
}
```

In another embodiment, scheduler 214 is implemented as a broadcast scheduler built on top of the live scheduler discussed above, which adds support to schedule linear blackouts on top of live 24×7 content. An example interface for the broadcast scheduler is shown in the following Pseudo Code Example V:

```
Pseudo Code Example V interface IBroadcastScheduler : public ILiveScheduler
{
    ScheduleLinearBlackout( );
    // This is the output from the scheduler
    vector<SequentialPlaylistEntry> SequentialPlaylist( );
    IPlayerSequencer LiveDVRModel( );
    IPlayerSequencer FutureAdUpdateModel( );
}
```

System 200 according to one embodiment uses at least four different timelines. The first timeline is a manifest timeline. Manifest timestamps are declared in the manifest. The second timeline is a pipeline timeline. Pipeline timestamps are reported by the native pipeline 218 as current playback position. The pipeline timestamps are expected to match the manifest timestamps. The third timeline is a linear timeline with linear timestamps. The linear timeline typically describes the main content (which may consist of one or more clips) and is normalized to start from 0. Pause timeline true advertisements are modeled as 0-duration playlist entries on the linear timeline. The fourth timeline is a seekbar timeline. Seekbar timestamps are generated when the user clicks on the seekbar, and the application wishes to seek to the position corresponding to the clicked location. The seekbar is either showing the linear timeline, or it is showing the seekable range of a pause timeline true advertisement that is currently playing. In the case of the former, the seekbar timestamp is the same as a linear timestamp. In the case of the latter, the seekbar timestamp is the same as the manifest timestamp.

In one embodiment, the sequential playlist provided to base sequencer 216 from scheduler 214 is a list of playlist entries arranged in chronological order. Each playlist entry according to one embodiment consists of the following four items:

(1) A uniform resource identifier (URI) pointing to a single-segment manifest. The URI may be of any format (e.g., Smooth, DASH, HLS, progressive, static page, VAST manifest).

(2) Splice-in and splice-out times (expressed using manifest timestamps), which define a subrange of the whole single-segment manifest to play.

(3) Linear start time and duration. Pause timeline true advertisements are represented as having a linear duration of 0. In one embodiment, all linear playlist entries declare linear duration up front, even if this means pre-downloading the manifest at the time of scheduling. An exception is if there is only a single linear entry, in which case a placeholder value of 0-infinity can be used until the manifest is downloaded on-demand.

(4) An indication of whether or not the playlist entry represents an advertisement. Advertisements involve special (trusted) tracing mechanisms to allow for content providers to be paid.

In one embodiment, system 200 uses four types of sequential playlist entries: (1) Media; (2) static page; (3) video ad serving template (VAST) manifest; and (4) seek-to-start. Each of these is discussed in further detail below.

For a media type of sequential playlist entry, the URI is a media URL (e.g., smooth, progressive, HLS, DASH, special offline scheme).

For a static page type of sequential playlist entry, the URI points to a static page, such as the "recommender" page in post-roll which allows the viewer to share the video he or she just watched, and to recommend other videos that he or she may enjoy. Static pages are typically represented as pause timeline true (linear duration 0). The native player application 202 uses or implements a core player 218 that can play static advertisements, including extracting a display duration from the URI, responding to FF/REW, etc.

For a VAST manifest type of sequential playlist entry, the URI points to a VAST manifest. A VAST manifest resolver downloads and parses the VAST manifest in order to resolve to a media URL that it can actually play. This also gives the opportunity for the client to set up an events sink for tracking URLs.

A seek-to-start type of sequential playlist entry is a special entry that is placed just ahead of the first entry that has a non-zero linear duration, and is deleted after completion (OnEndOfMedia or Seek—ManifestToSeekbarTime will not terminate playback due to the need to initialize the live DVR model). If the main content is on-demand, the URL can be null. If the main content is live, the URL points to the live main content, even if the first non-zero linear duration entry does not.

The seek-to-start entry looks like a pause timeline true advertisement, with playback range from 0 to infinity and linear duration of 0. It is not intended that the application 202 actually play this content. Rather, if the application 202 already knows where it wants to start playback, the application 202 can execute this by issuing any of the following: (1) If the application 202 knows that the content is on-demand, the application can call OnEndOfMedia to start playback at the left edge of main content (OnEndOfMedia avoids the possibility of infinite loops which arises if there is a persistent advertisement at 0 and the application 202 calls Seek (linear pos 0)); (2) Seek (linear resume time) if resuming from last played position (live or on-demand); (3) First call ManifestToSeekbarTime with the min/max/current manifest timestamps, followed by Seek (linear server live position) if the application 202 has a way to know this without downloading the manifest (i.e., has a formula to convert from wallclock time to manifest time).

If the application 202 does not know where it wants to start playback, because it does not know the server live position, then this corresponds with cases (1) and (3) above. The application 202 starts playback in the usual way, which causes the manifest to be downloaded. Once playback begins, the application 202 can deduce whether the content was live or on-demand, and if live, can deduce the server live position. The application 202 then executes case (1), OnEndOfMedia, or case (3), ManifestToSeekbarTime, with min/max/current manifest timestamps and Seek (linear server live position). Note that it is okay to call ManifestToSeekbarTime multiple times. The last writer wins and represents the manifest timestamp range of the live presentation to properly initialize the live DVR model.

Starting playback of a live manifest to establish server live position is sub-optimal if it turns out that the live position is in the middle of an advertisement, but this is done because the sequencer 228 is format-agnostic and therefore relies on the native player application 202 to obtain the current server live position and report back. If being sub-optimal is an issue, then one solution is to use manifest timestamps that correspond to wallclock time.

In one embodiment, the playlist itself provides a locking mechanism for thread synchronization so that changes (e.g., additions, deletions and modifications) to two or more playlist entries can be atomic.

The sequential playlist according to one embodiment supports the following scenarios: (1) On-demand video (preroll/postroll, RCE, pause timeline true and false over on-demand video); (2) live video (preroll/postroll, pause timeline false advertisements over live video); and (3) linear live video (linear blackout).

In one embodiment, sequential playlist entries are not sufficient to describe to the native player application 202 what to play. Sequential playlist entries (clips) according to one embodiment are wrapped in an object called a "playback segment," which contains additional information. Playback segments can be thought of as "marching orders" for a core player 218. The additional information in a playback segment according to one embodiment includes an initial playback start time and an initial playback rate, which are described in further detail below.

The initial playback start time is a manifest time within the playback subrange defined by the sequential playlist entry. For instance, if the native player application 202 seeks within the same clip, then it will be issued a new playback segment whose clip is the same as the previously playing clip. The initial playback start time will reflect the requested seek position. After starting playback here, the player is free to allow playback to roam within the playback subrange defined in the sequential playlist entry.

The initial playback rate is used to implement linear trick modes, where rewinding back through one clip and into another starts playback of the next clip at the end, and in rewind mode, so that the two clips appear to be one single linear piece of content.

Because of the structure of the playback segment, the native player application 202 according to one embodiment possesses the following capabilities:

(1) Ability to play progressive and at least one adaptive format (e.g., Smooth/DASH/HLS) in single-segment form. Typically the native application 202 already has a way to get a content URL in the form that it supports (e.g., Smooth/DASH/HLS). In other words, even prior to integration of the sequencer 228, a single-segment iOS player, for example, should already know how to get main content URLs for HLS format, and single-segment Silverlight players should already know how to get main content URLs for Smooth. It is expected, however, that advertisements may sometimes be distributed in progressive MP4 format.

(2) Ability to play a single-segment URL starting at a particular position and at a particular playback rate.

(3) Ability to signal end-of-media (media has finished playing).

(4) Ability to play live single-segment content and properly render the seekbar (min/max/current position=manifest timestamp) on its own. Ability to determine the current server live position (maximum playback timestamp, not the actual server live buffering position).

Advertisements may be in unresolved form (i.e., may be represented in the sequential playlist as a pointer to a VAST manifest). The client is responsible for resolving the VAST manifest. Resolution of a VAST manifest according to one embodiment proceeds as follows:

(1) The sequential playlist entry for VAST has a null ClipURI pointing to the VAST manifest.

(2) The application 202 can download the VAST manifest, which may be customized based on parameters supplied by the client. For instance, if the ad server knows the IP address of the client, it may resolve this to a geolocation and serve ads that are appropriate for a region. If the ad server knows the identity of the viewer, it can access demographic information, and serve appropriate ads. If the search or ad viewing history of the viewer is known, this too can be used to modify the VAST manifest.

(3) The VAST manifest can contain multiple representations of the same advertisement. The application 202 is responsible for choosing the one that is the most appropriate for the player capabilities. For instance, on the iOS platform, the most likely choice would be the HLS form of the advertisement.

(4) The VAST manifest also contains tracking information, so that events such as ad playback progress (midpoint, quartiles, completion) and user events (mute, pause, click-through) can be reported and acted upon. The application 202 is responsible for implementing this tracking functionality.

The timing of VAST resolution could vary. It can be done just-in-time by providing a plug-in for sequencer 228 which detects and resolves playback segments that point to VAST entries. It can also be done ahead of time by iterating through the sequential playlist. It should be noted, however, that resolution of the VAST manifest might not be a one-time event. If the user plays the same VAST advertisement entry, the VAST manifest could be resolved each time it is played, resulting in a different advertisement each time. The business model dictates whether VAST manifest resolution is a one-time or each-time occurrence.

The application 202 can choose to implement VAST resolution as its own functionality, or it can choose to implement using a plug-in for sequencer 228. The sequencer plug-in, for instance, is frequently updated with playback position information, which puts the plug-in in a good position to detect and act on advertisement playback progress. The sequencer plug-in does not have visibility into user events such as mute, pause or click-through, but these can be communicated via custom attributes. The application can create a custom attribute class that is consumed by the sequencer plug-in responsible for advertising tracking Given a native player application 202 that is capable of playing single-segment content from a variety of formats (e.g., progressive, Smooth, DASH, HLS), the steps for integrating the sequencer 228 according to one embodiment are as follows:

(1) Modify the "Open" function to create a new sequencer using a factory function (this actually creates a sequencer chain). Call Seek(0) to play any preroll ads. If this returns a seek-to-start entry, the application 202 may Seek (linear last played position) or call OnEndOfMedia to begin playback from left edge of main content. Either call returns a playback segment containing a single-manifest URI and a starting playback position. Execute this playback segment.

(2) Modify the seekbar updating code to first ask the sequencer 228 for the seekbar left/right, and to translate current pipeline (manifest) timestamp to seekbar position. If the sequencer 228 reports that current playback range is exceeded, the native player application 202 stops playback if end-of-media had been reached, and calls the sequencer's OnEndOfMedia.

(3) Modify the "Seek" function to call Seek(Pipeline/Manifest Time) first. This will either instruct the native player application 202 to stick with the current clip (in which case the application 202 may proceed with a regular seek), or a new clip (in which case the application 202 acts as though it were asked to open a new URL).

(4) Modify the "EndOfMedia" handler to call the sequencer's OnEndOfMedia to check if this is really the end. If not, the application 202 will be instructed to play a new clip at an initial playback position and playback rate.

(5) Implement playback policy by ghosting and/or ignoring the appropriate UI buttons (can seek, can skip, etc).

In the absence of any optimizations, buffering for the next clip does not begin until the previous clip has finished playback. This can lead to several seconds delay when transitioning between clips. One optimization provided by system 200 according to one embodiment is to use local media files for advertisements, so that transitioning to advertisements is quick. Another optimization is to utilize double-buffering, where buffering for the next clip begins prior to the previous clip completing playback. In one embodiment, double buffering is implemented as follows:

(1) The core player 218 fires an event that indicates that buffering for the current clip has completed (the download position for all streams have reached end-of-stream). Let us call this end-of-buffering. It is safe to buffer the next clip at this time since no further network activity is expected for the previous clip.

(2) Upon end-of-buffering, the native player application 202 asks the sequencer 228 to "peek" at the next playback segment, via OnEndOfBuffering (unlike OnEndOfMedia, OnEndOfBuffering has no side effects). The next playback segment is reported.

(3) The native player application 202 starts buffering (but not playing) the next segment.

In one embodiment, the native player application 202 is expected to perform a frame-accurate splice-in. If it is not capable of doing so, the sequencer 228 will hide this from being shown on the seekbar. If frame accuracy is desired on splice-out, the native player application 202 is free to communicate this to the core player 218 as follows:

(1) Monitor the playback range on the sequential playlist entry. A convenient place to do this is during the frequent calls to ManifestToSeekbarTime. Use the minimum or maximum rendering time (whichever is appropriate for the direction of playback) to set the splice-out on the core player 218.

(2) Changes to the playback range may occur at any time. Such changes are not signaled in any way, so it is the responsibility of the native player application 202 to detect and act on such changes.

Three splice-out scenarios will now be discussed.

Scenario 1—Static Sequential Playlist (1) Assume that this is a two-clip main content scenario, no advertisements, play from start to finish.

(2) Upon starting playback of the first clip, the native player application 202 notes the playback range, and sets the splice-out point to be the MaxRenderingTime of the sequential playlist entry, because playback rate is in a forward direction.

(3) The core player 218 is designed to stop rendering at the given MaxRenderingTime and to issue end of media to the native player application 202.

(4) While playing the first clip, the native player application 202 checks for changes to MaxRenderingTime, but finds no changes.

(5) The core player 218 signals end of media and stops rendering exactly at MaxRenderingTime (frame accurate). The native player application 202 calls IPlayerSequencer::OnEndOfMedia and is told to play the second clip. This differs from an unoptimized implementation, which will play slightly past the splice-out point and be told to stop playing via ManifestToSeekbarTime (at which point they will call OnEndOfMedia).

Scenario 2—Playing at Live Position, Advertisement Scheduled for Future (1) Assume this is live content, playing at live, and an advertisement is scheduled for the future.

(2) After executing a seek-to-start (to the live position), the native player application 202 is given a playback segment pointing to main content live. The playback range MaxRenderingTime is infinity.

(3) At some point, the ad scheduler is told of an upcoming advertisement and schedules an advertisement in the future. The existing sequential playlist is modified by the scheduler 214 to include the future advertisement.

(4) The next time the native player application 202 checks the currently playing sequential playlist entry (typically during the ManifestToSeekbarTime call), the application 202 notices that the MaxRenderingTime has changed from infinity to a finite value. The native player application 202 conveys this update to the core player 218.

(5) The core player 218 signals end of media and stops rendering exactly at MaxRenderingTime (frame accurate). The native player application 202 calls IPlayerSequencer::OnEndOfMedia and is told to play the advertisement. This differs from an unoptimized implementation, which will play slightly past the splice-out point and be told to stop playing via ManifestToSeekbarTime (at which point they will call OnEndOfMedia).

(6) The advertisement itself is typically a single on-demand asset that is played in its entirety, which means that having a core player 218 that is capable of frame-accurate splice-out typically only affects splice-out from main content. It is not necessary for splice-out from advertisements.

Scenario 3—Playing at Live Position, Advertisement Scheduled Just Before Current Position (1) This is a variation of scenario 2 above. Steps 1-3 are the same as scenario 2.

(2) The next time the native player application 202 calls ManifestToSeekbarTime, it will be told to stop playback. The application 202 does so, issuing a OnEndOfMedia.

(3) The new playback segment instructs the native player application 202 to play the advertisement at some offset into the advertisement (not at the beginning). The offset is computed using the last playback position reported via ManifestToSeekbarTime.

(4) In this case, the fact that the core player 218 is optimized for frame-accurate splice-out makes no difference, because the scheduler 214 was late in scheduling the advertisement, and so no opportunity for frame-accurate splice-out was given.

The playback policy is a custom attribute on each sequential playlist entry. The native player application 202 according to one embodiment does not access this attribute directly, however. Rather, each call to ManifestToSeekbarTime returns a playback policy that is the combination of the playback policy on the sequential playback entry, and a dynamic playback policy imposed by the sequencer plug-in chain. An example of this would be the live DVR model plug-in 210 disabling fast forward when the current position is too close to the live position.

In general, playback policy is initialized as totally permissive at the head of the sequencer chain, and each sequencer plug-in has a chance to restrict policies (AND operation) as the call progresses down the chain. In one embodiment, the sequencer chain does not actually enforce playback policy. Rather, enforcement of playback policy is done by the native player application 202, above the level of the sequencer 228. If the current playlist entry is marked as unskippable, IPlayerSequencer::SkipForward does not enforce this, and allows the skip.

In the case of single-segment manifest playback, with no advertisements, the sequencer 228 returns playback segments that refer to the current clip. In the case of single-segment manifest playback, with no advertisements, and a resume from last played is indicated, the following may be performed:

(1) The application 202 remembers that, when the last time this presentation was played (possibly on another device), the last linear timestamp recorded was 10000.

(2) During "open", the application 202 calls Seek(0). This returns a seek-to-start entry. Since the application 202 knows where it wants to start, it calls Seek(LinearTime 10000). The sequencer 228 returns a playback segment pointing to the main content, with playback range of 0-20000, and an initial playback position of 10000.

(3) The core player 218 is told to start playing at 10000, but accurate seek is not supported, and playback actually begins at 9000.

(4) The core player 218 asks the sequencer 228 to paint the seekbar. The sequencer 228 does not enforce initial playback position in any way, and 9000 is within the playback range of 0-20000, so the sequencer 228 translates the manifest timestamp into a linear timestamp as usual, and returns linear left/right for seekbar painting.

It is the task of a dynamic ad scheduler to implement preroll ads. One method of doing this is by scheduling one or more entries with linear duration 0 at linear start time 0, with the "delete after playing" attribute set to true. For example, assume that there is a two-segment main content that consists of the first main content clip with linear start time of 0 and linear duration of 10000, and the second main content clip with linear start time 10000 and duration 5000. The following will be performed:

(1) During "open", Seek(LinearTime 0) returns a playback segment pointing to the pause timeline true advertisement. The core player 218 starts playing the preroll advertisement.

(2) As the preroll advertisement starts playing, the core player 218 asks the sequencer 228 how to paint the seekbar. The core player 218 passes in the pipeline-reported min/max/current positions. Since pause timeline true content is being played, the sequencer 228 passes the pipeline-reported values through. The seekbar is therefore painted in exactly the same way as prior to sequencer integration.

(3) When the preroll advertisement finishes playing, the core player 218 reports this to the sequencer 228 via OnEndOfMedia call. Since the preroll advertisement is marked as delete after playing, the sequencer 228 deletes the sequential playlist entry. The sequencer 228 returns a seek-to-start playback segment.

(4) The application 202 can tell that this is on-demand from the URL (which is null). The application 202 has no specific starting point in mind, so it calls OnEndOfMedia rather than Seek(linear). Since the seek-to-start entry is marked as delete after playing, it is deleted. The sequencer 228 returns a playback segment pointing to the first clip of the main content, playback range 50000-60000, initial playback position of 50000. The core player 218 starts playing the first clip of the main content, but does not support accurate seek, so playback starts at 49000.

(5) As the first clip of the main content starts playing, the core player 218 asks the sequencer 228 how to paint the seekbar. The sequencer 228 notes that 49000 is outside the playback range of 50000-60000, but that playback rate is >=0, so that it will eventually reach the desired playback range. Because of this, the sequencer 228 chooses not to terminate playback. The sequencer 228 ignores pipeline-reported min/max and translates current position into a linear timestamp, which is bounded by playback range. In other words, a manifest timestamp of 50000 would normally be translated into linear time 0. Thus, a manifest timestamp of 49000 is snapped to the acceptable playback range, and reported the same as a manifest timestamp of 50000 (linear time 0). In this way, non-accurate seeks are allowed, but the seekbar does not progress during the rendering of splice-in content (which is normally not rendered by players that do support accurate seek). Linear min/max of 0-15000 is returned and this is used to paint the seekbar.

(6) OnEndOfMedia is called for first main content clip. The sequencer 228 returns a playback segment for the second clip of main content.

(7) The core player 218 asks the sequencer 228 how to paint the seekbar. Manifest timestamp is translated to linear timestamp>=10000. Linear min/max of 0-15000 is returned and this is used to paint the seekbar.

(8) OnEndOfMedia is called for the second main content clip. No playback segment is returned. The end of the presentation has been reached.

In one embodiment, system 200 handles seeking across clips in the following manner. Given a sequential playlist with two main content clips (0-10000, 10000-15000) and no advertisements: (1) Since both clips are linear (i.e., not pause timeline true), the seekbar is always set to 0-15000; (2) If the first clip is currently being played, and the user clicks on position 12500 in the seekbar, then Seek(SeekbarTime 12500) returns a playback segment pointing to the second clip; and (3) the native player application 202 translates this "seek" operation into an "open" operation and spawns a new core player 218 to play the second clip.

In one embodiment, system 200 handles single-segment, live main content in the following manner. The sequential playlist consists of a single entry pointing to the live manifest, with a linear start time of 0 and a linear duration of infinity. The initial playback position of this playlist is set to infinity. The following are performed:

(1) During "open", Seek(LinearTime 0) returns a seek-to-start segment. The URI is a pointer to the main live manifest.

(2) Either the core player 218 starts playing the live content, at which point the server live position becomes known, or, the native player application 202 is able to deduce the server live position using other means (such as converting current wallclock time into an NTP-synchronized manifest timestamp).

(3) ManifestToSeekbarTime can be called multiple times. The latest call contains actual min/max/current server live manifest timestamps from the live presentation.

(4) The native player application 202 converts manifest time to linear time and calls the sequencer's Seek (LinearTime=current live position). The sequencer 228 returns a playback segment pointing to the same clip as is currently playing. This information is used by the sequencer 228 to initialize the live model in the scheduler 214, which is used to implement "fake live" when playing on-demand content at the live position.

(5) Playback proceeds from the live position.

In one embodiment, system 200 handles single-segment, live main content with a preroll advertisement in the following manner. When the system 200 starts playing the main content after the preroll advertisement, the system 200 joins at the live position. Preroll advertisements are typically marked as "delete after playing", so they will not be played a second time if the user seeks or rewinds to the beginning again. When the last preroll advertisement completes, typically via a call to OnEndOfMedia, the playback segment returned is a seek-to-start. The URI is a pointer to the main live manifest, and playback of the live main content proceeds.

In one embodiment, system 200 handles live main content with overlay advertisements (Pause Timeline False) at live ("fake live") in the following manner. If one takes live main content and schedules a single linear overlay advertisement at linear time 1M, the result is a sequential playlist with three entries: live main content 0-1M, overlay advertisement 1M-1.5M, live main content 1.5M-infinity. The following are performed:

(1) During "open", Seek(LinearTime 0) returns a seek-to-start segment with a URI pointing to the live main manifest. The application 202 executes a seek to live.

(2) Assume that the current live position is 1.1M. The native player application 202 converts the manifest timestamp to linear time and calls the sequencer's Seek (LinearTime=current live position). The live DVR model plug-in 210 initializes its model. Assume that the live model is a rolling DVR window of width 200,000. The model is therefore initialized to have a playable (seekable) range from 0.9M-1.1M.

(3) The base sequencer 216 would return a playback segment pointing to the advertisement manifest (on-demand). The playback subrange is not modified and still shows 1M-1.5M, even though playing at 1.5M would put the playback position past the current server live position.

(4) Playback of the linear advertisement begins at 1.1M (part way into the advertisement). Note that playback range does not denote buffering range, which is unconstrained.

(5) The core player 218 asks how to paint the seekbar. The live model plug-in 210 is used to trim the linear timeline, and a seekable range of 0.9-1.1M is reported, with current playback position at 1.1M. The user is not able to seek past the current server live position with this seekbar.

(6) Two seconds later, the live model updates and two seconds are added to playback range left/right. This update is reflected very quickly in the seekbar.

(7) Any attempt to fast forward will cause playback position to exceed server live position. This will be detected in the next seekbar painting update and the sequencer 228 will instruct the native player application 202 to end playback. When the native player application 202 complies, a playback segment is returned which instructs the native player application 202 to play at +1× at the current server live position (as determined by the live model, SeekToLive is *false*).

(8) Once playing at the live position, the live DVR model plug-in 210 can prevent fast forward by disabling this in the playback policy. The application 202 continues to call the sequencer 228 frequently with position updates, so if position changes, the live DVR model plug-in 210 can re-enable fast forward.

In one embodiment, system 200 handles rewinding through multiple clips in the following manner. Assume that a user is playing near the end of a multiple-clip presentation. The following are performed.

(1) The user hits rewind. The core player 218 enters rewind mode. The sequencer 228 is not explicitly notified of this, but the core player 218 continues to ask the sequencer 228 how to paint the seekbar. This informs the sequencer 228 that the system is currently in rewind mode, but the sequencer 228 does not care.

(2) The playback position reaches the start of content. This is reported to the sequencer 228 via OnEndOfMedia. The sequencer 228 returns a playback segment pointing to the previous clip, with an initial start position at the end of the clip, and an initial playback rate that is the same as the playback rate reported via OnEndOfMedia.

(3) The core player 218 executes this playback segment. It appears to the user as though the user is rewinding through two clips as if the clips were actually one unbroken piece of linear content (i.e., a single clip).

In one embodiment, system 200 handles fast forwarding to the live position in the following manner.

(1) The sequencer 228 is notified of playback position as the core player 218 asks the sequencer 228 how to paint the seekbar.

(2) Eventually, the current playback position either equals or exceeds the maximum playback timestamp. The sequencer 228 notes that the playback rate is greater than 1, and therefore the core player 218 will continue to move away from the desired playback range. The sequencer 228 tells the seekbar painting code to terminate playback as if end of media had been reached.

(3) The core player 218 stops playback and calls OnEndOfMedia reporting a playback rate>1. The sequencer 228 responds by returning a playback segment pointing to the current clip, with initial playback position equal to the maximum playback timestamp (live position), and initial playback rate of +1.

(4) As an optimization, while at the live position, further attempts to enter fast forward may optionally be blocked by way of playback policy. As playback position (as reported via seekbar painting code) drifts away from live position, playback policy may be relaxed to allow fast forward again.

In one embodiment, system 200 handles a user being paused on live content, close to the left edge of the DVR window, in the following manner.

(1) Even when paused, the native player application 202 is expected to call the sequencer 228 frequently for seekbar painting instructions. This is so that server live position can continue to be painted on the seekbar, which continues to advance even as the user is paused.

(2) When calling for seekbar painting instructions, the native player application 202 reports playback rate as 0.

(3) Eventually, the current playback position is equal to or less than the minimum playback range timestamp. The sequencer 228 notes that the playback rate is 0, and so the playback position will continue to move away from the desired playback range. On this call to ManifestToSeekbarTime, the sequencer 228 sets*pfPlaybackRangeExceeded to true to terminate the current playback session.

(4) The native player application 202 complies with the request by stopping playback and calling OnEndOfMedia. The sequencer 228 returns a playback segment pointing to the current (live) clip, initial playback position at left edge of DVR window, initial playback rate of +1×.

In one embodiment, system 200 handles a mid-playback invalidation of a currently playing playlist entry in the following manner. In one embodiment, it is the responsibility of the base sequencer 216 to deal with the scenario where the sequential playlist has been updated, thus invalidating the currently playing playlist. Thus, when the application 202 calls IPlayerSequencer with a pointer to the sequential playlist entry that is currently playing, which no longer exists in the new sequential playlist, the base sequencer 216 deals with this situation. This can be dealt with in a number of ways, including (but not limited to): (1) Keeping the old sequential playlist around until nobody is referencing it (in this way, the old sequential playlist entry can be mapped to a linear timestamp, which can then be mapped to the new sequential playlist entry); or (2) disallow wholesale replacement of sequential playlists, and instead implement the add/delete/modify API (in this way, deletion or modification of a playlist entry can mark the entry as "dead" but still keep it in the playlist until nobody is referencing it). It should be noted that implementation of option (1) suggests the creation of a CircularReference class, which allows for a reference to a sequential playlist entry to keep its parent sequential playlist alive, and allows for access to the parent from the child.

In one embodiment, system 200 handles a live event becoming on-demand in the following manner. When a live event ends and becomes on-demand, the native player application 202 signals this by calling OnEndOfMedia on the current playback segment. If the current playback segment points to the last sequential playlist entry in the list, then the base sequencer 216 will return null for the next playback segment, which causes the application 202 to stop playback.

There may be cases where the current playback segment does not point to the last sequential playlist entry in the list. This can arise if advertisements have been scheduled for a future time that now will no longer be reachable. In one embodiment, the scheduler 214 is configured to avoid scheduling advertisements that will never be reached.

In one embodiment, system 200 handles start-over and cloud DVR situations in the following manner. Smooth format supports live-to-VOD manifests that are essentially infinite manifests. Such manifests allow for "start-over" functionality, which allows a user joining in the middle of a live television program to rewind to the start, even though the user joined afterwards. They also allow for cloud DVR scenarios where the player can be instructed to play a live (infinite) manifest between two finite timestamps. In one embodiment, the scheduler 214 is responsible for creating the sequential playlist and updating it, using a plug-in 210 that models the live DVR window. In the case of "start-over", the live DVR window plug-in 210 is set with the appropriate parameters so that the left edge does not roll forward, but instead stays fixed at start-of-program. When the current program ends and a new program begins, the live DVR window plug-in 210 is configured to know this. In the case of cloud DVR, the scheduler 214 is responsible for initializing the live DVR model in plug-in 210 so that the playback range is constrained to the proper range.

In one embodiment, system 200 handles the seeking over of unplayed advertisements in the following manner. The mid-roll advertisements are clearly visible on the main content (linear) seekbar. When the user seeks over one or more unplayed advertisements, the system 200 forces the viewer to watch the closest skipped advertisement, before finishing the seek. Consider the following example: (1) Playback of main content begins at timestamp 0, and there is an advertisement at timestamp 10000 ms; (2) the user immediately seeks to 12000 ms, which seeks over the unplayed ad at 10000 ms; (3) the system 200 forces the user to watch the ad at 10000 ms; and (4) when the advertisement is complete, the system 200 completes the seek to 12000 ms.

In one embodiment, this functionality is implemented in the sequencer 228 by the application 202 inserting a "force ad playback" sequencer plug-in at the start of the chain whose Seek( ) implementation checks for skipped advertisements, and if it finds them, defers playback. In one embodiment, the following are performed.

(1) The force ad playback plug-in receives a Seek(seekbar time==linear time==12000 ms) command directly from the application 202. The plug-in forwards this request to the next plug-in the chain of sequencer plug-ins. Eventually this reaches the base sequencer 216, which returns a playback segment pointing to main content, initial playback position 12000.

(2) The force ad playback plug-in takes the returned playback segment, finds the playlist entry position in the playlist, and walks backwards in the playlist until it finds a playlist entry which returns true for IsAdvertisement( ).

(3) The force ad playback plug-in queries for a custom attribute by IID (GUID). Assume that this custom attribute is an object with one method, AdHasBeenPlayed( ). If the custom attribute is found, and if AdHasBeenPlayed( ) returns true, then the plug-in returns the playback segment unmodified and no ad is played. Otherwise, the plug-in will want to force the closest advertisement to be played.

(4) In this example, the force ad playback plug-in finds the playlist entry for the advertisement at 10000 ms, and it does not find the custom attribute. Therefore, this advertisement has not been played. The plug-in enters the "deferred user action" state, and saves the playback segment (pointing to main content @ 12000 ms) for later use.

(5) Instead of returning the playback segment pointing to main content @ 12000 ms, the force ad playback plug-in calls into the sequencer chain with Seek(linear 10000) to obtain a playback segment to the advertisement. Thus, the plug-in does not create its own playback segment, but rather obtains one through the sequencer chain. This allows the sequencer chain plug-ins to perform their normal adjustments, such as dynamic playback policy.

(6) The force ad playback plug-in returns the playback segment for the advertisement, which the application 202 executes.

(7) The application 202 completes playback of the advertisement and calls OnEndOfMedia.

(8) The force ad playback plug-in's OnEndOfMedia implementation first notes that the current playback segment is an advertisement. It creates an object which will return true for AdHasBeenPlayed( ), and attaches it to the sequential playlist entry for the current playback segment.

(9) The force ad playback plug-in then notes that it is in a "deferred user action" state. The plug-in exits this state and returns the saved playback segment which points to main content at 12000 ms.

(10) The application 202 executes the deferred user seek to main content at 12000 ms.

(11) Any future seeks past the advertisement at 10000 ms will not force playback of the advertisement because the custom attribute will return a value of true for AdHasBeenPlayed( ).

In one embodiment, system 200 is configured to provide format-agnostic captions in the following manner. In one embodiment, format-agnostic captioning is implemented with a sequencer plug-in. Captions can be conveyed in-band (format-specific), typically embedded in the video bitstream, or out-of-band, typically as a sidecar file (SMPTE-TT). It is often conveyed in both ways, simultaneously. In one embodiment, out-of-band captions (format-agnostic) are provided in the following way.

(1) Whenever asked to play a new playback segment, which includes a media URL, the application 202 obtains a list of URLs to caption sidecar files (each URL would be for a particular language). Based on the user settings, the application 202 chooses the appropriate captions URL.

(2) The application 202 instantiates a captions plug-in given a media URL, captions URL, and event handler, and inserts the captions plug-in into the chain of plug-ins in the sequencer 228.

(3) The captions plug-in passes through all IPlayerSequencer calls to the chain, and modifies no responses.

(4) The captions plug-in acts on calls to IPlayerSequencer::ManifestToSeekbarTime. During this call, if the current playback segment matches the media URL that the captions plug-in was instantiated with, the captions plug-in then pays attention to the current playback position (expressed in manifest time).

(5) If the playback position cross a caption trigger, the captions plug-in fires an event and delivers the caption payload to the application 202. The application 202 renders the caption immediately.

(6) Multiple caption plug-ins may exist simultaneously in the sequencer plug-in chain.

(7) In the case of live content, the captions plug-in is responsible for keeping itself updated. For instance, it can poll (re-download) the captions file periodically. Or, a more advanced protocol can be employed.

(8) It is the responsibility of the application 202 to resolve conflicts between in-band and out-of-band captions, and choose only one to be active at any one time.

Figure 3:
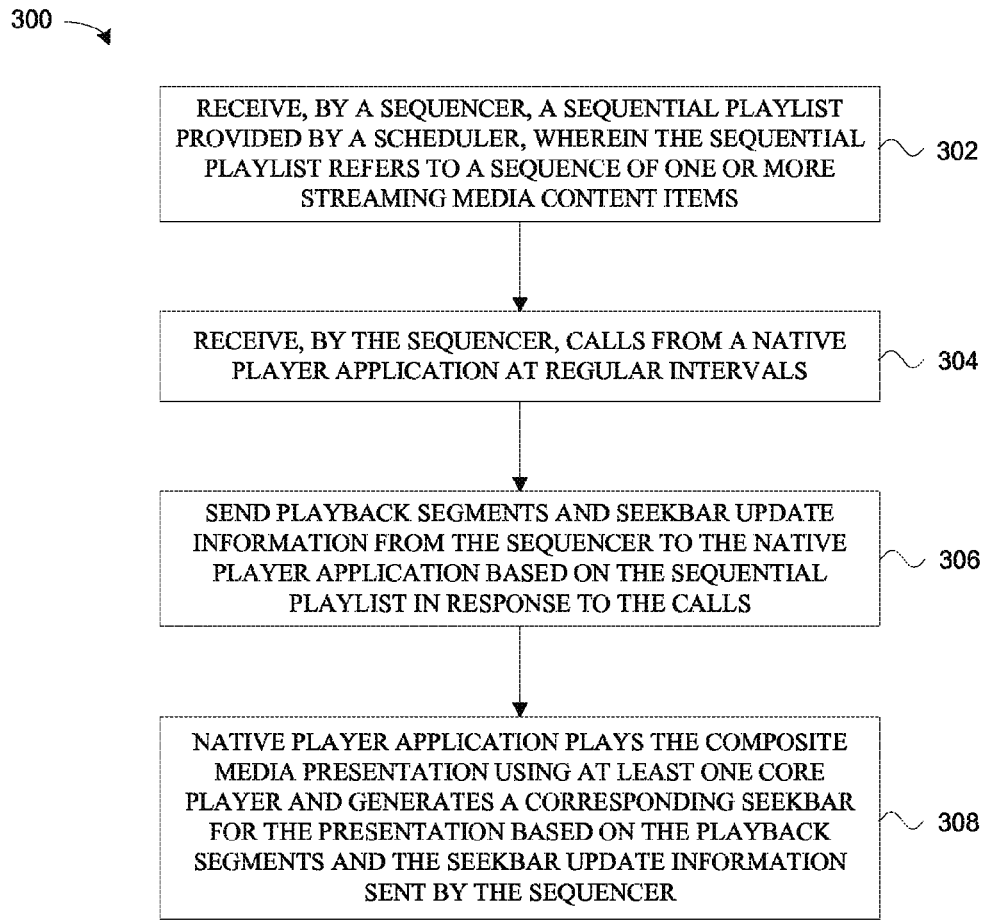
FIG. 3 is a flow diagram illustrating a computer-implemented method for seamlessly playing a composite media presentation according to one embodiment.

FIG. 3 is a flow diagram illustrating a computer-implemented method 300 for seamlessly playing a composite media presentation according to one embodiment. In one embodiment, media player system 200 (FIG. 2) is configured to perform method 300. At 302 in method 300, a sequencer receives a sequential playlist provided by a scheduler, wherein the sequential playlist refers to a sequence of one or more streaming media content items. At 304, the sequencer receives calls from a native player application at regular intervals. At 306, the sequencer sends playback segments and seekbar update information to the native player application based on the sequential playlist in response to the calls. At 308, the native player application plays the composite media presentation using at least one core player and generates a corresponding seekbar for the presentation based on the playback segments and the seekbar update information sent by the sequencer.

In one embodiment of method 300, the native player application, the at least one core player, and the sequencer, are implemented on a client computing device that is configured to receive the composite media presentation from a plurality of server computers. The sequencer in method 300 according to one embodiment is platform-independent and stateless, and the method 300 further includes receiving, by the sequencer, with each of the calls, a pointer to a playlist entry in the sequential playlist that is currently playing.

In one embodiment of method 300, the playback segments comprise a combination of main content, at least one linear advertisement, and at least one non-linear advertisement. In one form of this embodiment, the main content comprises on-demand content. In another form of this embodiment, the main content comprises live content. In yet another form of this embodiment, the sequencer is configured to support fast forwarding and rewinding through the combination of main content, at least one linear advertisement, and at least one non-linear advertisement.

In one embodiment of method 300, each of the playback segments includes an initial playback start time and an initial playback rate. Each of the playback segments according to one embodiment includes a uniform resource identifier (URI) pointing to a single-segment manifest. In one form of this embodiment, each of the playback segments includes splice-in and splice-out times that define a subrange of the single-segment manifest to play, a linear start time and duration, and an indication of whether the playback segment represents an advertisement. The playback segments according to one embodiment represent a plurality of different media formats, including at least two of Motion Picture Experts Group 4 (MPEG4 or MP4) progressive, Smooth, HTTP live streaming (HLS), and dynamic adaptive streaming over HTTP (DASH). In one embodiment, the sequencer in method 300 includes an application programming interface (API) that allows the native player application to skip and modify playlist entries in the sequential playlist.

Another embodiment is directed to a client computing device, which includes a core player, and a native player application configured to cause single-segment media content to be played on the core player. The client computing device further includes a sequencer configured to receive a sequential playlist from a scheduler, and send playback segments and seekbar update information to the native player application based on the sequential playlist. The sequencer comprises a plurality of sequencer plug-ins in a chain configuration such that each sequencer plug-in directly calls a next one of the sequencer plug-ins in the chain configuration. The native player application is configured to play a composite media presentation and generate a corresponding seekbar for the presentation based on the playback segments and the seekbar update information sent by the sequencer.

In one embodiment, the sequencer of the client computing device is configured to receive calls from the native player application at regular intervals and upon predetermined events, and send the playback segments and seekbar update information to the native player application in response to the calls. In one embodiment, one of the sequencer plug-ins comprises a live DVR model that models a server live position and DVR window. In another embodiment, one of the sequencer plug-ins comprises an advertisement tracking model. The sequencer according to one embodiment is platform-independent.

Another embodiment is directed to a computer-readable storage medium storing computer-executable instructions that when executed by at least one processor cause the at least one processor to perform a method for seamlessly playing a composite media presentation. The method includes receiving, by a sequencer, a sequential playlist provided by a scheduler. The sequential playlist refers to a sequence of one or more streaming media content items. The sequencer comprises a plurality of sequencer plug-ins in a chain configuration. The method includes receiving, by the sequencer, calls from a native player application at regular intervals, wherein each of the calls includes a pointer to a playlist entry in the sequential playlist that is currently playing. The method further includes sending playback segments and seekbar update information from the sequencer to the native player application based on the sequential playlist in response to the calls. The native player application is configured to play the composite media presentation using at least one core player and generate a corresponding seekbar for the presentation based on the playback segments and the seekbar update information sent by the sequencer.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer-implemented method for seamlessly playing a composite media presentation, the method comprising:
receiving, by a sequencer, a sequential playlist provided by a scheduler, wherein the sequential playlist refers to a sequence of one or more streaming media content items;
receiving, by the sequencer, calls from a native player application at regular intervals;

sending playback segments and seekbar update information from the sequencer to the native player application based on the sequential playlist in response to the calls; and wherein the native player application is configured to play the composite media presentation using at least one core player and generate a corresponding seekbar for the presentation based on the playback segments and the seekbar update information sent by the sequencer, and wherein the native player application, the at least one core player, and the sequencer, are implemented on a client computing device that receives the composite media presentation from a plurality of server computers.

2. The computer-implemented method of claim 1, wherein the sequencer is platform-independent and stateless, and wherein the method further comprises:

receiving, by the sequencer, with each of the calls, a pointer to a playlist entry in the sequential playlist that is currently playing.

3. The computer-implemented method of claim 1, wherein the playback segments comprise a combination of main content, at least one linear advertisement, and at least one non-linear advertisement.

4. The computer-implemented method of claim 3, wherein the main content comprises on-demand content.

5. The computer-implemented method of claim 3, wherein the main content comprises live content.

6. The computer-implemented method of claim 3, wherein the sequencer is configured to support fast forwarding and rewinding through the combination of main content, at least one linear advertisement, and at least one non-linear advertisement.

7. The computer-implemented method of claim 1, wherein each of the playback segments includes an initial playback start time and an initial playback rate.

8. The computer-implemented method of claim 1, wherein each of the playback segments includes a uniform resource identifier (URI) pointing to a single-segment manifest.

9. The computer-implemented method of claim 8, wherein each of the playback segments includes splice-in and splice-out times that define a subrange of the single-segment manifest to play.

10. The computer-implemented method of claim 9, wherein each of the playback segments includes a linear start time and duration.

11. The computer-implemented method of claim 10, wherein each of the playback segments includes an indication of whether the playback segment represents an advertisement.

12. The computer-implemented method of claim 1, wherein the playback segments represent a plurality of different media formats, including at least two of Motion Picture Experts Group 4 (MPEG4 or MP4) progressive, Smooth, HTTP live streaming (HLS), and dynamic adaptive streaming over HTTP (DASH).

13. The computer-implemented method of claim 1, wherein the sequencer includes an application programming interface (API) that allows the native player application to skip and modify playlist entries in the sequential playlist.

14. A client computing device, comprising:

a core player;

a native player application configured to cause single-segment media content to be played on the core player;

a sequencer configured to receive a sequential playlist from a scheduler, and send playback segments and seekbar update information to the native player application based on the sequential playlist, wherein the sequencer comprises a plurality of sequencer plug-ins in a chain configuration such that each sequencer plug-in directly calls a next one of the sequencer plug-ins in the chain configuration; and wherein the native player application is configured to play a composite media presentation and generate a corresponding seekbar for the presentation based on the playback segments and the seekbar update information sent by the sequencer, and wherein the core player, native player application, and sequencer are implemented using at least one processor in the client computing device.

15. The client computing device of claim 14, wherein the sequencer is configured to receive calls from the native player application at regular intervals and upon predetermined events, and send the playback segments and seekbar update information to the native player application in response to the calls.

16. The client computing device of claim 14, wherein one of the sequencer plug-ins comprises a live DVR model that models a server live position and DVR window.

17. The client computing device of claim 14, wherein one of the sequencer plug-ins comprises an advertisement tracking model.

18. The client computing device of claim 14, wherein the sequencer is platform-independent.

19. A computer-readable storage medium storing computer-executable instructions that when executed by at least one processor cause the at least one processor to perform a method for seamlessly playing a composite media presentation, the method comprising:

receiving, by a sequencer, a sequential playlist provided by a scheduler, wherein the sequential playlist refers to a sequence of one or more streaming media content items, and wherein the sequencer comprises a plurality of sequencer plug-ins in a chain configuration such that each sequencer plug-in directly calls a next one of the sequencer plug-ins in the chain configuration;

receiving, by the sequencer, calls from a native player application at regular intervals, wherein each of the calls includes a pointer to a playlist entry in the sequential playlist that is currently playing;

sending playback segments and seekbar update information from the sequencer to the native player application based on the sequential playlist in response to the calls; and wherein the native player application is configured to play the composite media presentation using at least one core player and generate a corresponding seekbar for the presentation based on the playback segments and the seekbar update information sent by the sequencer; and wherein the native player application, the at least one core player, and the sequencer, are implemented on a client computing device that receives the composite media presentation from a plurality of server computers.

* * * * *